United States Patent
Murali Krishna Ryali et al.

(10) Patent No.: US 9,438,749 B2
(45) Date of Patent: Sep. 6, 2016

(54) METHODS AND SYSTEMS FOR PROVIDING TELECOMMUNICATION SERVICES FROM DISPARATE TELECOMMUNICATION SERVICE PROVIDERS

(71) Applicant: Infosys Limited, Bangalore (IN)

(72) Inventors: Venkata Murali Krishna Ryali, Bangalore (IN); Anil Nagpal, Haryana (IN); Ananta Pavan Kumar Gidugu, Ashoknagar (IN); Thrilok Sn, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/638,353

(22) Filed: Mar. 4, 2015

(65) Prior Publication Data
US 2015/0271343 A1 Sep. 24, 2015

(30) Foreign Application Priority Data
Mar. 20, 2014 (IN) .......................... 1485/CHE/2014

(51) Int. Cl.
*H04M 15/00* (2006.01)
*H04M 3/38* (2006.01)

(52) U.S. Cl.
CPC ............ *H04M 15/715* (2013.01); *H04M 3/38* (2013.01); *H04M 15/42* (2013.01); *H04M 15/49* (2013.01); *H04M 15/51* (2013.01); *H04M 15/61* (2013.01); *H04M 15/70* (2013.01); *H04M 15/72* (2013.01); *H04M 15/721* (2013.01); *H04M 15/805* (2013.01)

(58) Field of Classification Search
CPC ......... H04M 1/72522; H04M 3/4938; H04M 3/42348; H04M 3/4878; H04M 3/493; G06Q 30/02; G06Q 30/0207; G06Q 30/0241; G06Q 30/0252; G06Q 30/0256; H04L 12/4641
USPC ................. 379/111, 114.01, 114.05, 121.01, 379/121.03, 122, 201.01, 201.02, 201.03, 379/201.04, 201.05, 114.03, 115.01, 130
See application file for complete search history.

(56) References Cited

U.S. PATENT DOCUMENTS

| | | | | |
|---|---|---|---|---|
| 6,430,276 B1* | 8/2002 | Bouvier | ............... | H04M 15/00 370/355 |
| 6,526,275 B1* | 2/2003 | Calvert | ............ | H04M 3/42348 455/418 |
| 6,636,590 B1* | 10/2003 | Jacob | .................... | G06Q 30/02 379/114.05 |
| 6,934,530 B2* | 8/2005 | Engelhart | ........... | H04L 12/4641 379/122 |
| 6,941,134 B2* | 9/2005 | White | ............... | H04M 1/72563 379/114.01 |
| 8,009,820 B2* | 8/2011 | Curtis | ............. | G06Q 10/06311 379/201.03 |
| 2003/0061068 A1* | 3/2003 | Curtis | ............. | G06Q 10/06311 705/26.25 |
| 2006/0020783 A1* | 1/2006 | Fisher | .................... | G06Q 20/02 713/156 |

(Continued)

Primary Examiner — Binh Tieu
(74) Attorney, Agent, or Firm — Marc S. Kaufman; Amardeep S. Grewal; Reed Smith LLP

(57) ABSTRACT

The technique relates to a method and system for providing a plurality of telecommunication services from disparate telecommunication service providers. This technique involves authenticating the client at the time of login to the system based on the received user credentials from the client. Displaying a list of available telecommunication services and service providers to the authenticated client and prompting the client to select one or more telecommunication services and service providers from whom the client wishes to avail the selected services. Once the client selects the desired services and service providers, it generates a service request and forward the same to the APIs of the selected service providers for rendering the selected services.

16 Claims, 3 Drawing Sheets

(56) References Cited

U.S. PATENT DOCUMENTS

2010/0002850 A1* 1/2010 Jaiswal ............... H04M 3/4938
379/88.04

2014/0236945 A1* 8/2014 Wysocki ............ A63B 69/0028
707/736
2014/0297386 A1* 10/2014 Allen .................. H04L 12/1403
705/14.27

* cited by examiner

METHODS AND SYSTEMS FOR PROVIDING TELECOMMUNICATION SERVICES FROM DISPARATE TELECOMMUNICATION SERVICE PROVIDERS

RELATED APPLICATION DATA

This application claims priority to India Patent Application No. 1485/CHE/2014, filed Mar. 20, 2014, the disclosure of which is hereby incorporated by reference in its entirety.

FIELD OF THE INVENTION

The present invention relates generally to telecommunication services. More specifically, the present invention relates to a system and method for providing telecommunication services to customers from disparate telecommunication service providers.

BACKGROUND

Telecommunications industry has seen rapid growth in last few years. The industry has numerous Telecommunication Service Providers (TSPs) providing various telecommunications and value added services to customers. Existence of numerous service providers has resulted in lot of competition in the telecommunication industry. Also, these services are priced differently by each of the TSPs. The need for operational effectiveness and cost management has also increased due to ever increasing global competitiveness and changing economic trends.

Conventionally, various systems and methods exist for providing telecommunication services to customers/customers. For example, various TSPs exist that provide numerous telecommunication services such as, but not limited to, Short Messaging Service (SMS), Multimedia Messaging Service (MMS), voice calling and video conferencing to their customers. The customers can avail these telecommunication services by opting for one or more packages provided by a TSP. A customer opts for a particular TSP and a particular package based on his usage. Usually, the customer opts for the TSP and the package that provides frequently used services at a lower cost in comparison with the less frequently used services. For example, a customer who messages more frequently than making voice calls would opt for a package that offers him cheaper SMS rates even though the voice call service might be expensive. Further, there may exist a situation where a different TSP provides messaging service, voice call service or any other telecommunication service at a lower cost as compared to the customer's current TSP. In conventional systems, the customer is free to choose his TSP and can change his current TSP to a different TSP. However, the customer cannot change his TSP every time he wishes to use a telecommunication service offered by a different service provider at a lower cost as compared with the price of the telecommunication service offered by the current TSP for the same service.

In light of the above mentioned disadvantages, there exists a need for a system and method for availing telecommunication services from disparate TSPs. Further, there is a need for a system and method that facilitates the customer to avail telecommunication services that are cost efficient. Furthermore, there is a need for a system and method that facilitates the customer to avail the telecommunication services from the TSP of his choice.

SUMMARY

The present disclosure overcomes the above mentioned drawback by providing telecommunication services to the customers from disparate telecommunication service providers. With the help of this technique the customer can avail telecommunication services from TSP of his choice.

According to the present embodiment, a method for providing a plurality of telecommunication services from disparate telecommunication service providers is disclosed. The method includes receiving user credentials from a client over a communication network and authenticating the client based on the received user credentials. A list of available telecommunication services and service providers are displayed to the authenticated clients. The authenticated client is prompted to select one or more telecommunication services and one or more service providers providing the one or more telecommunication services from the displayed list. A service request is generated based on the one or more selected telecommunication services and the one or more selected service providers. Then, the service request is forwarded to application programming interface (API) of the one or more selected service providers for rendering the one or more selected telecommunication services.

In an additional embodiment an apparatus for providing a plurality of telecommunication services from disparate telecommunication service providers is disclosed. The apparatus includes a memory coupled to one or more processors which are configured to execute programmed instructions stored in the memory including receiving user credentials from a client over a communication network, authenticating the client based on the received user credentials, displaying a list of available telecommunication services and service providers to the authenticated client, prompting the authenticated client to select one or more telecommunication services and one or more service providers providing the one or more telecommunication services from the displayed list, generating a service request based on the one or more selected telecommunication services and the one or more selected service providers and forwarding the service request to application programming interface (API) of the one or more selected service providers for rendering the one or more selected telecommunication services.

In another embodiment, a computer readable storage medium for providing a plurality of telecommunication services from disparate telecommunication service providers is disclosed. The computer readable storage medium for providing a plurality of telecommunication services from disparate telecommunication service providers which is not a signal stores computer executable instructions for receiving user credentials from a client over a communication network, authenticating the client based on the received user credentials, displaying a list of available telecommunication services and service providers to the authenticated client, prompting the authenticated client to select one or more telecommunication services and one or more service providers providing the one or more telecommunication services from the displayed list, generating a service request based on the one or more selected telecommunication services and the one or more selected service providers and forwarding the service request to application programming interface (API) of the one or more selected service providers for rendering the one or more selected telecommunication services.

BRIEF DESCRIPTION OF THE DRAWINGS

The present invention is described by way of embodiments illustrated in the accompanying drawings wherein.

DETAILED DESCRIPTION

The present invention provides a system and method for providing telecommunication services from disparate Telecommunication Service Providers (TSPs). Further, the present invention facilitates the customer to avail telecommunication services that are cost efficient. Furthermore, the present invention provides a system and method that facilitates the customer to avail the telecommunication services from the TSP of his choice. In addition, the present invention provides a system and method that allows the customer to select a different service provider of their choice for each telecommunication service he wishes to avail.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. In addition, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purposes of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
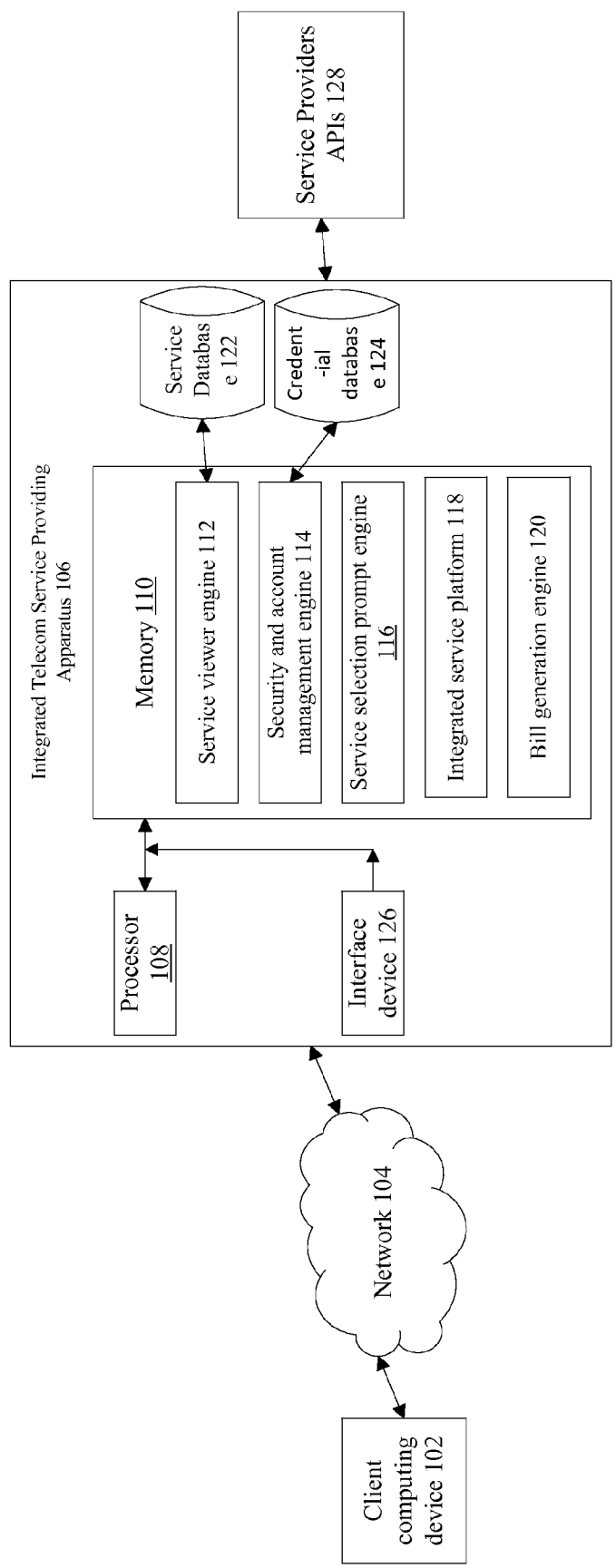
FIG. 1 is a block diagram of a system for providing telecommunication services from disparate telecommunication service providers, in accordance with an embodiment of the present invention.

FIG. 1 is a block diagram of a system for providing telecommunication services from disparate telecommunication service providers, in accordance with an embodiment of the present invention. The system includes client computing device 102, network 104, integrated service providing apparatus 106 and service providers APIs 128. This environment can include other types and numbers of systems, devices, components, and elements in other configurations, such as multiple numbers of each of these apparatuses and devices. With the help of client computing device 102, clients communicate with the integrated service providing apparatus 106 trough communication network 104. By way of example, the communications network 104 could use TCP/IP over Ethernet and industry-standard protocols, including NFS, CIFS, SOAP, XML, LDAP, and SNMP, although other types and numbers of communication networks, such as a direct connection, a local area network, a wide area network, a personal area network, such as Bluetooth, modems and phone lines, e-mail, and wireless communication technology, each having their own communications protocols, can be used.

The integrated service providing apparatus 106 includes central processing unit (CPU) or processor 108, a memory 110, an interface device 216, a service database 122 and a credential database 124 which are coupled together by a bus or other link, although other numbers and types of systems, devices, components, and elements in other configurations and locations can be used. The processor 108 executes a program of stored instructions for one or more aspects of the present technology as described and illustrated by way of the examples herein, although other types and numbers of processing devices and logic could be used and the processor could execute other numbers and types of programmed instructions.

The memory 110 stores these programmed instructions for one or more aspects of the present technology as described and illustrated by way of the examples herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 108, can be used for the memory 110. The memory 110 also includes service viewer engine 112, security and account management engine 114, service selection prompt engine 116, integrated service platform 118 and bill generation engine 120.

The service viewer engine 112 displays various services that can be availed through the apparatus 106. In an embodiment of the present invention, the service viewer engine 112 displays information providing the details on various parameters of the services being offered such as types of services, number of service providers offering a particular type of service, price range being offered, special offers and discounts, subscription options etc. The service viewer engine 112 also stores and displays various plans that the system offers for individuals as well as for corporates. In another embodiment of the present invention the service viewer engine 112 further displays feedbacks received from an existing customer on the services availed by them. In yet another embodiment of the present invention, the information displayed by the service viewer engine 112 can be further modified as per the preference of the client. In various embodiments of the present disclosure the service may include but are not limited to web phone services, voice call services, messaging services, voice conference services. For web phone services, the service viewer engine 112 provides information pertaining to call rates, pulse rates, subscription plans and so on. This further provides a utility to draw a comparative study amongst the services plans offered by various service providers. This comparative study provides an indication to the customer on the service provider offering the best services at the most reasonable prices. The service viewer engine 112 by way of its comparative study provides indicative references on the basis of which the client may select service provider. In case of voice call services, the service viewer engine 112 provides information pertaining to the call charges, pulse rates, network coverage, etc. This further provides a test call service where the client can test the services prior to subscribing for the same. The service viewer engine 112 further provides a utility to draw a comparative study amongst the service plans of the various service providers. The comparative study provides an indication to the client on the service provider offering the best services at the most reasonable prices on the basis of which the customer may select service provider. In case of messaging services, the service viewer engine 112 provides details pertaining to the messaging rates, bulk SMS charges, allowable message length, multimedia message service support, flash SMS support and so on. This further provides the utility to draw a comparative study amongst the service of the various service providers. The comparative study provides an indication to the client on the service provider offering the best services at the most reasonable prices on the basis of which the client may select service provider. In case of voice conference services, the service viewer engine 112 provides details pertaining to the voice conference facility being offered by the system. In an example the details may include information such as maximum number of parties that can join a voice conference, the pulse rates, the call charges for each party, network support, charges pertaining to multiple call moderator rights, different call rates applicable to connect parties subscribing to services from other service providers and so on. This further provides a utility to draw a comparative chart comparing the benefits and cost of the service offered by various service providers. The comparative study provides an indication to the customer on the service provider offering the best services at the most reasonable prices on the basis of which the customer may select service provider.

The service viewer engine is operatively connected with service database 122. The services database 122 is a repository for storing information pertaining to the various telecommunication services available on the integrated services platform 118. The services database 122 may be an active database having an event driven architecture responsive to conditions provided by the client. The services database receives information from the various service providers detailing the services offered by each of these service providers. Further, the services database 122 is linked to the service providers APIs 128 to update the services database 122 with new services offered by the service providers and relaying the information to the integrated services platform 118. The security and account management module 114, manages access rights and service delivery to the client and thereby restricts unauthorized client from accessing the service platform 118. The security and account management module 114 is operatively coupled with credential database 124 which stores access rights and credentials of all the clients. The service selection prompt engine 116 is configured to prompt the client to select the services they want to avail and also the service providers from whom the services is availed. Once the client confirms the service plan that he wishes to avail thereby finalizing the service provider he would be availing the services from and initiates a service request to be handled by the service platform 118. There may be several customers accessing the system at the same time hence the service platform 118 creates a service request queue for every received service request and addresses the service requests based on a predefined set of criteria.

Once the client has selected the service provider through the service platform 118 the client is connected to a specific service provider's API through service providers API component 128. The service provider's API further connects the user to service provider's server. Service provider's server handles the service request and ensures that the user is provided the service selected by him. After routing the service request to the service provider's API the service platform 118 takes up the next service request in the queue. At the end of the session when the client has availed the services the bill generation engine 120 generates a bill detailing the session information and the cost incurred towards the services availed by the client.

The interface device 126 in the integrated telecom service providing apparatus 106 is used to operatively couple and communicate between the integrated telecom service providing apparatus 106 and the client computing device 102 via communication network 104.

Figure 2:
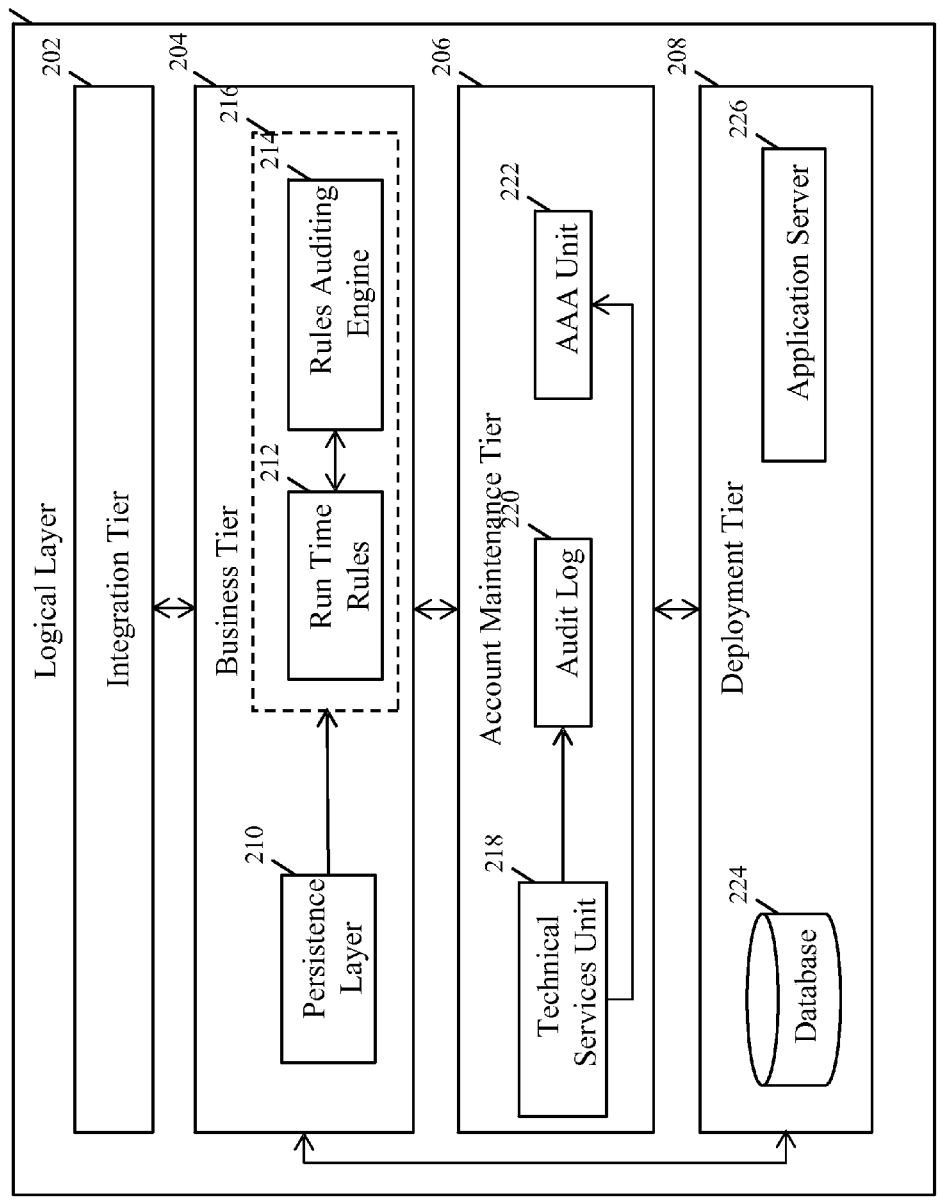
FIG. 2 illustrates a multi-tier architectural overview of a logical layer of the system to facilitate customers to avail services from multiple TSPs, in accordance with an embodiment of the present invention.

FIG. 2 illustrates a multi-tier architectural overview of a logical layer of the system to facilitate client to avail services from multiple TSPs, in accordance with an embodiment of the present invention. The multi-tier architecture provides a model to create a flexible and reusable application. The multi-tier architecture further facilitates application of Separation of Concerns (SoC) principle and low coupling. In an embodiment of the present invention, using the Separation of Concerns (SoC) principle allows better scalability as each tier can be separated onto different computer systems distributing the processing load. The multi-tier architecture provides the flexibility to add or modify a specific tier and thereby saves the efforts of rewriting the complete application in the event of changes in any tier of the architecture. Logical layer comprises an integration tier 202, a business tier 204, an account maintenance tier 206 and a deployment tier 208.

In an embodiment of the present invention, the integration tier 202 provides the services required by the system to interact with the external environment. The integration tier 202 communicates with customer interface via web services. The integration tier 202 provides a Web Services Description Language (WSDL) based description to describe the various functionalities offered by the web services. WSDL provides a mechanism to call for the services being offered by web services. WSDL further provides a description of parameters that the web services would require and the data structure that it would return in response to the call for service. The integration tier 202 aggregates information from the various tiers of the logical layer and provides a unified data view to the various applications interacting with logical layer.

The integration tier 202 receives request in the form of Simple Object Access Protocol (SOAP) messages and sends out responses as a SOAP message. The routing of messages in and out of the integration tier 302 takes place via web services.

The business tier 204 provides components and services that encapsulate the business logic. The business tier 204 contains code that works with the data and processes in accordance with a set of rules of business logic. In an embodiment of the present invention, the business tier 204 is connected to the account maintenance tier 206 and the deployment tier 208. Thus, the communication of the account maintenance tier 206 and the deployment tier 208 with the integration tier 202 is carried out via the business tier 204. The business tier 204 further comprises a rules engine 216 and a persistence layer 210.

In an embodiment of the present invention, the persistence layer 210 deals with storing and retrieving data from a database and manages the actual reading and writing of data on to a database. In another embodiment of the present invention persistence layer 210 is configured to handle data storage and access operations associated with database 224. The business tier 204, the run time rule module 212 and the rules engine 216 uses the persistence layer 210 to retrieve the data from the database 224 as well as to save the data on to the database 224. In yet another embodiment of the present invention the persistence layer 210 can be implemented as a standalone layer separate from the business tier 204.

Rules engine 216 typically supports rules, facts, priorities, exclusion, condition and other similar functions. Each rule has a condition and an associated action. The rules engine 216 defines the rules that are to be followed to avail services from the system of present invention. The rules being implemented by the rules engine 216 may be derived from a company policy, a legal regulation or other sources. The rules engine 216 further comprises a runtime rules module 212 and a rules auditing engine 214.

Run time rule module 212 stores rules related to inaugural discount given to a first time customer, the password format to be used while creating an account, the amount of idle time allowed to a client before logging him off the system, etc. The rules stored in the run time rule module 212 is a subset of the rules associated with the rules engine 216. In an embodiment of the present invention the rules stored in the run time rule module 212 can be modified based on the current requirement. The run time rule module 212 follows a condition based action structure for implementing the various rules stored therein.

The rules auditing engine 214 performs audit on the rules that are being run by the rules engine 216. The rules auditing engine 214 runs a constant check and validate the rules that are being implemented by the rules engine 216. The function of the rules auditing engine 214 is to ensure that the rules are being implemented at the right stage of the process. An audit log unit 220 of the account maintenance tier 206 maintains a log of the audits performed by the rules auditing engine 214.

The account maintenance tier 206 provides common technical services like account maintenance and security services like sign on, audit log, and customer's account log for the system of present invention. The account maintenance tier 206 further comprises a technical services unit 218, an audit log unit 220 and an authorization, authentication and accounting unit 222 (AAA unit).

The technical services unit 218 manages the functioning of the audit log unit 220 and the AAA unit 222. The technical service unit 218 determines whether for a particular task the audit log unit 220 or the AAA unit 222 has to be used.

The audit log unit 220 maintains a log of various activities being performed by the system of the present invention. The audit log unit 220 maintains a log of every customer account and tracks various activities performed by the customer during each log in session. The audit log unit 220 further maintains a log of the audits performed by the rules auditing engine 214.

The AAA unit 222 provides the essential authentication and authorization support to the system and performs the accounting function wherein the AAA unit 222 maintains the accounting information pertaining to the transaction history of every session along with the cost incurred during the transaction carried out during every session. In an embodiment of the present invention the AAA unit 222 provides a single sign on support to the customer. The customer performs authentication only once during the complete process thereby saving him the effort of authenticating at multiple instances.

The deployment tier 208 comprises a database 224 and an application server 326. The application server 226 provides a framework in which an application can run. The application server 226 is accessible through an Application Programming Interface (API). The database 224 is an organized collection of data received from the customers and service providers. The database stores data pertaining to details of services being offered by the various service providers, customers account related information, details of the customer credential and access rights etc. All the data flowing in or out of the database 224 is routed through the persistence layer 210. Hence, the database 224 receives request and sends response through a single channel.

Figure 3:
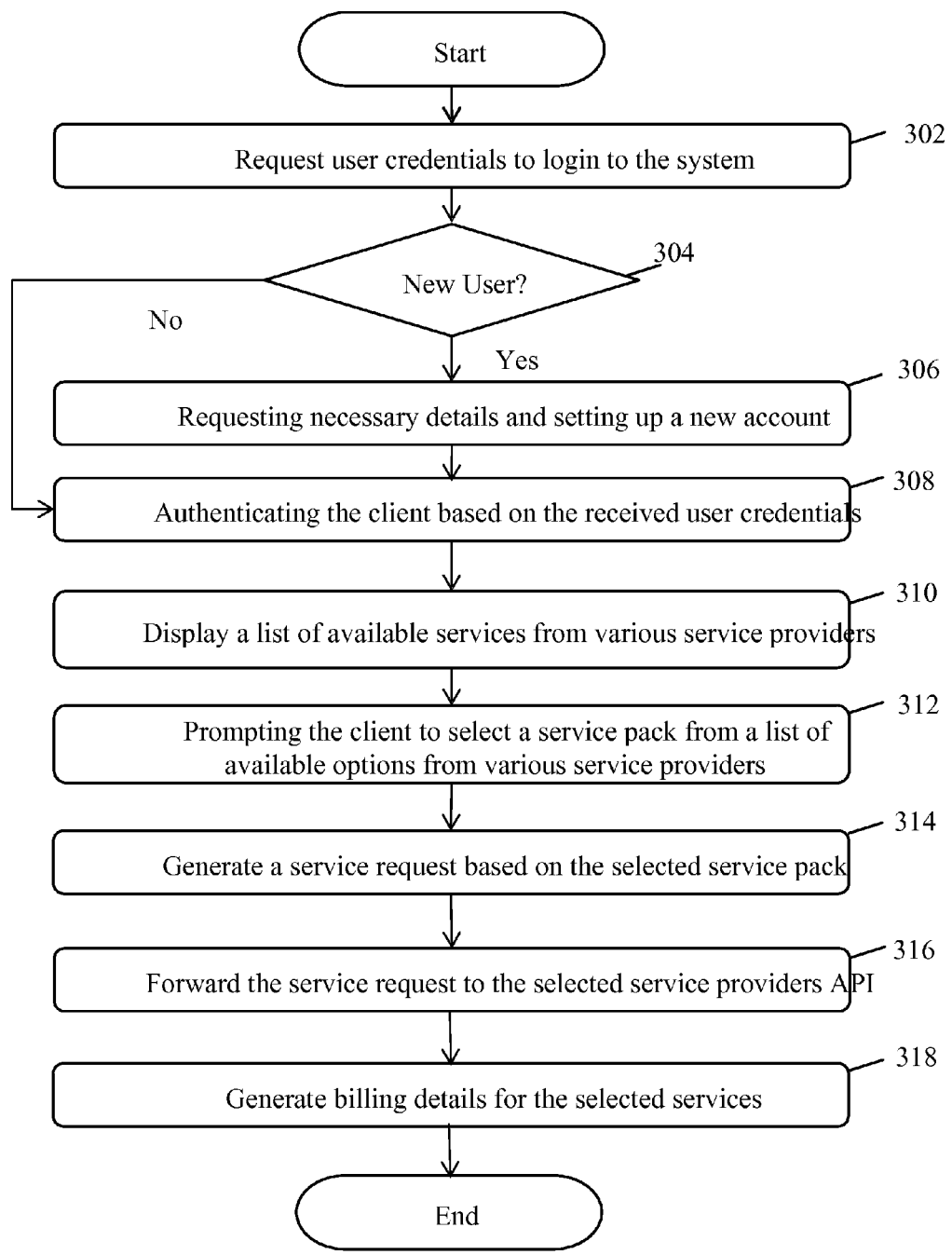
FIG. 3 is a flowchart illustrating a method for providing telecommunication services from disparate telecommunication service providers, in accordance with an embodiment of the present invention.

FIG. 3 is a flowchart illustrating a method for availing telecommunication services from disparate telecommunication service providers, in accordance with an embodiment of the present invention.

At step 302, the system requests the client to enter user credentials provided at the time of account creation to login to the system. At step 304, a check is performed to ascertain whether the customer is a registered customer. At step 304, if it is ascertained that the customer is not a registered customer, a new account creation page is displayed where the customer is requested to provide the required information, select from a list of available subscription options and register with the system as mentioned in step 306. The customer creates a profile by providing necessary details such as personal information, payment details, service preferences etc. and sets up an account. On creation of account, the customer is provided with a set of credentials to authenticate and avail the services via the integrated services platform. In another embodiment of the present invention, the customer modifies the details such as personal information, payment details, service preferences and other related information provided by the customer at the time of account creation.

At step 304, if it is ascertained that the customer is already registered, then at step 308 the credentials are matched against a set of credentials stored in a credential database to validate the authenticity and determine the access right of the customer based on the furnished credentials. If the credentials entered are found to be matching with the credentials stored in the credential database the customer is provided access to the system. If the credentials are found to be incorrect the customer is redirected to the login page.

In an embodiment of the present invention, the maximum numbers of login trials are fixed. If a customer exceeds the maximum number of login trials the customer's account may be temporarily disabled.

At step 310, a list of telecommunication services from various telecommunication service providers along with service details and price are displayed. At step 312, the system prompts the client to select one or more telecommunication services and also the service providers from whom the client wish to avail the services. At step 314, the system generates a service request based on the selection made by the client. At step 316, the service request is forwarded to the selected service providers APIs, wherein the service providers APIs handle the service request. At step 318, billing details including session details corresponding to the services availed by the client is generated. In an embodiment of the present invention, the session detail provides comprehensive information pertaining to the services availed by the client during current session, the time duration for which the services have been used, details of the service availed, account balance at the start of the current session, the cost incurred towards the services availed and the balance available for future transactions. The client reviews the session details provided to him and validates whether he has been charged correctly for the services availed by him. The client further has the facility to request for a detailed bill and can request for a re-evaluation of the bill in case the charges levied on him are not justified The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A computer-implemented method executed by one or more computing devices for providing a plurality of telecommunication services from disparate telecommunication service providers, the method comprising:
   receiving, by at least one of the one or more computing devices, user credentials from a client device over a communication network;
   authenticating, by at least one of the one or more computing devices, the client device based on the received user credentials;
   displaying, by at least one of the one or more computing devices, a list of available telecommunication services and telecommunication service providers to the authenticated client device;
   prompting, by at least one of the one or more computing devices, the authenticated client device to select one or more telecommunication services and one or more telecommunication service providers providing the one or more telecommunication services from the displayed list;
   generating, by at least one of the one or more computing devices, a service request based on the one or more selected telecommunication services and the one or more selected telecommunication service providers; and
   forwarding, by the computing device, the service request to an application programming interface (API) of the one or more selected telecommunication service providers for rendering the one or more selected telecommunication services.

2. The method of claim 1 further comprising generating billing information after the one or more selected telecommunication services are rendered by the client device.

3. The method of claim 2, wherein the billing information includes session details and cost incurred to render the one or more selected telecommunication services.

4. The method of claim 1, wherein the user credentials are provided to the client device at the time of account creation.

5. The method of claim 1, wherein the step of authenticating the client device comprises:
   determining, by the computing device, if the client device is registered to avail the plurality of telecommunication services; and
   if the client device is not registered, displaying an account creation page for registration.

6. An apparatus for providing a plurality of telecommunication services from disparate telecommunication service providers, comprising:
   one or more processors; and
   one or more memories operatively coupled to at least one of the one or more processors and having instructions stored thereon that, when executed by at least one of the one or more processors, cause at least one of the one or more processors to:
   receive user credentials from a client device over a communication network;
   authenticate the client device based on the received user credentials;
   display a list of available telecommunication services and telecommunication service providers to the authenticated client device;
   prompt the authenticated client device to select one or more telecommunication services and one or more telecommunication service providers providing the one or more telecommunication services from the displayed list;
   generate a service request based on the one or more selected telecommunication services and the one or more selected telecommunication service providers; and
   forward the service request to an application programming interface (API) of the one or more selected telecommunication service providers for rendering the one or more selected telecommunication services.

7. The apparatus of claim 6, wherein the one or more memories has further instructions stored thereon that, when executed by at least one of the one or more processors, cause at least one of the one or more processors to generate billing information after the one or more selected telecommunication services are rendered by the client device.

8. The apparatus of claim 7, wherein the billing information includes session details and cost incurred to render the one or more selected telecommunication services.

9. The apparatus of claim 6, wherein the user credentials are provided to the client at the time of account creation.

10. The apparatus of claim 6, wherein at least one of the one or more memories has further instructions stored thereon that, when executed by at least one of the one or more processors, cause at least one of the one or more processors to determine if the client device is registered to avail the plurality of telecommunication services at the time of authenticating.

11. The apparatus of claim 10, wherein at least one of the one or more memories has further instructions stored thereon that, when executed by at least one of the one or more processors, cause at least one of the one or more processors to display an account creation if the client device is not already registered.

12. At least one non-transitory computer-readable medium storing computer-readable instructions that, when executed by one or more computing devices, cause at least one of the one or more computing devices to:
   receive user credentials from a client device over a communication network;
   authenticate the client device based on the received user credentials;
   display a list of available telecommunication services and telecommunication service providers to the authenticated client device;
   prompt the authenticated client to select one or more telecommunication services and one or more telecommunication service providers providing the one or more telecommunication services from the displayed list;
   generate a service request based on the one or more selected telecommunication services and the one or more selected telecommunication service providers; and
   forward the service request to application programming interface (API) of the one or more selected telecommunication service providers for rendering the one or more selected telecommunication services.

13. The non-transitory computer readable medium of claim 12, further storing computer readable instructions that, when executed by one or more computing devices, cause at least one of the one or more computing devices to generate billing information after the one or more selected telecommunication services are rendered by the client device.

14. The non-transitory computer readable medium of claim 13, wherein the billing information includes session details and cost incurred to render the one or more selected telecommunication services.

15. The non-transitory computer readable medium of claim 12, wherein the user credentials are provided to the client device at the time of account creation.

16. The non-transitory computer readable medium of claim 12, wherein the instructions that, when executed by one or more computing devices, cause at least one of the one or more computing devices to authenticate the client device further cause at least one of the one or more computing devices to:
   determine if the client device is registered to avail the plurality of telecommunication services; and
   if the client device is not registered, displaying an account creation page for registration.

* * * * *